No. 859,452. PATENTED JULY 9, 1907.
L. KAHN & R. CHRIST.
AUTOMATIC CONTROLLER FOR GAS COCKS.
APPLICATION FILED MAR. 27, 1906.

Witnesses,
Samuel S. Carr
James G. Carr

Inventors,
Lazard Kahn,
and Rinehart Christ,
By Robert S. Carr. Atty.

UNITED STATES PATENT OFFICE.

LAZARD KAHN AND RINEHART CHRIST, OF HAMILTON, OHIO, ASSIGNORS TO THE ESTATE STOVE COMPANY, OF HAMILTON, OHIO, A CORPORATION OF OHIO.

AUTOMATIC CONTROLLER FOR GAS-COCKS.

No. 859,452.      Specification of Letters Patent.      Patented July 9, 1907.

Application filed March 27, 1906. Serial No. 308,348.

*To all whom it may concern:*

Be it known that we, LAZARD KAHN and RINEHART CHRIST, citizens of the United States, residing at Hamilton, Butler county, Ohio, have invented a new and useful Improvement in Automatic Controllers for Gas-Cocks, of which the following is a specification.

Our invention relates to automatic controllers for gas-cocks whereby accidental explosions of heating chambers may be prevented, and the objects of our improvement are to provide means to prevent the admission of gas to the burner before the pilot is opened; to provide means to regulate the admission of gas and of air to the mixing chamber; to make the pilot adjustable in length and to provide all other necessary adjustments.

These objects are attained in the following described manner as illustrated in the accompanying drawings, in which:—

Figure 1:
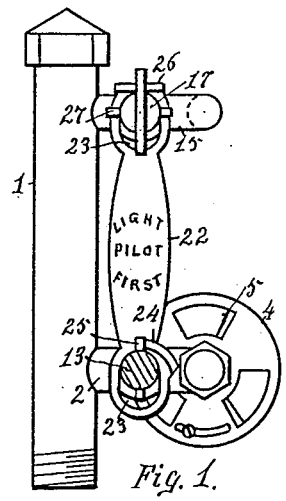
Figure 3:
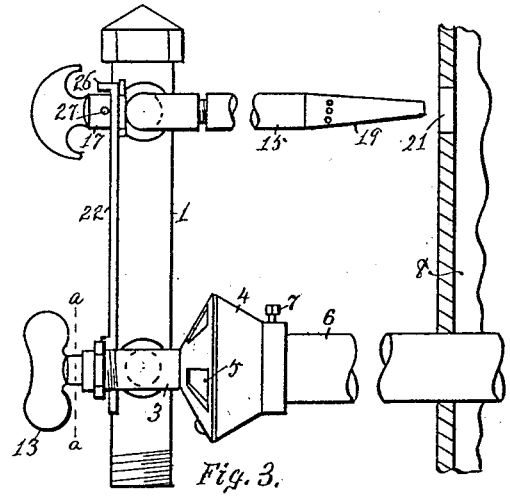
Figure 2:
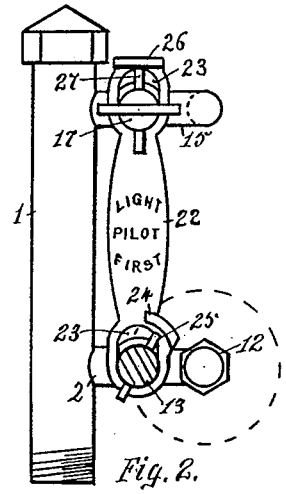
Figure 4:
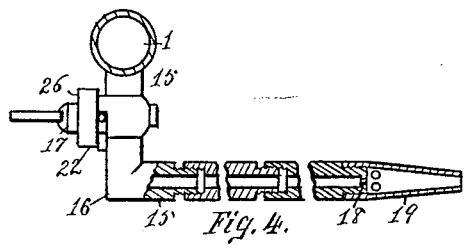

Figure 1, is a front elevation of an automatic controller for a gas cock embodying our improvements and showing the cock locked in the closed position; Fig. 2, a front elevation with the cock unlocked and partly open; Fig. 3 a side elevation of Fig. 1; Fig. 4, a plan with parts in section of the pilot and Fig. 5, a plan with parts in section of the mixing chamber and its connections.

In the drawings, 1 represents a vertical supply pipe, 2 a feed pipe leading therefrom and terminating in a T head 3. A mixing chamber 4 provided with adjustable air inlet openings 5 is removably secured on the rear end of the T head. A conduit 6 removably secured in the mixing chamber by means of set screw 7 leads to the burner (not shown) within heating chamber 8. The feed pipe 2 discharges within the mixing chamber through a jet opening 9 formed in the rear end of the T head. A needle valve 11 adjustably secured within the T head serves to control the jet opening and is protected by means of cap 12 which is removably secured thereover on the front end of the head. Feed pipe 2 is provided with a straight way gas cock 13 having its stem in a horizontal position and limited in its adjustment to a quarter turn by means of the usual stop pin 14. A pilot 15 leads from the supply pipe 1 at a point above the feed pipe, is parallel therewith, and is provided with a straight way pilot cock 17 having its stem directly above and parallel with the stem of cock 13. Said pilot consists of a plural number of tubular sections extensibly connected together and discharges through a terminal jet opening 18 therein through a mixing nozzle 19 which is removably secured thereon. Said nozzle terminates adjacent to and in registration with an opening 21 formed in the wall of the heating chamber and discharges therethrough to the interior of said chamber.

Figure 5:
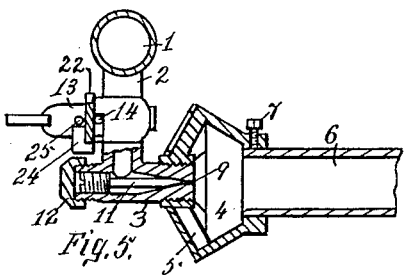

A plate or tumbler 22 is formed with an oblong opening or slot 23 through each of its end portions for the passage therethrough of the stems of the respective cocks 13 and 17 whereon said tumbler is vertically movable. The weight of the tumbler causes it to fall and automatically engage a stop 24 formed thereon with a projecting pin 25 which is carried by the stem of cock 13, whereby said cock is locked in the closed position as shown in Figs. 1 and 5. A horizontal projecting ledge 26 is formed on the tumbler, and pin 27 which is carried by the stem of cock 17 intercepts said ledge during the opening movement in either of opposite directions of said cock and lifts the tumbler with stop 24 thereon out of engagement with pin 25, thereby unlocking cock 13 as shown in Fig. 2. When both cocks are closed, the tumbler automatically falls by its own weight in the position shown in Fig. 1 and prevents the opening of cock 13 until the pilot cock 17 has first been opened as shown in Fig. 2. Being thus compelled to open the pilot cock first, the operator will evidently ignite the pilot before opening the gas cock and thus prevent the accumulation of gas within the chamber and the danger of an explosion when it is ignited. The pilot cock should be closed after the gas within the heating chamber is ignited, the gas cock remains adjustable until it is closed, when it is automatically locked by the descent of the tumbler.

Having fully described our improvement, what we claim as our invention and desire to secure by Letters Patent of the United States is:—

1. The combination of two cocks positioned with their stems in a vertical plane, radial pins carried by the respective stems, a gravity plate movably supported near its ends on the respective stems, said plate being provided with a stop and with a ledge adapted to detachably engage with the respective pins, for the purpose specified.

2. The combination of a supply pipe provided with a jet discharge opening, a needle valve for controlling said opening, a mixing chamber secured on said pipe over said opening and provided with adjustable air inlet openings, a pilot positioned above the supply pipe and communicating therewith, said pilot consisting of a series of tubular sections extensibly connected together, a mixing nozzle secured on the pilot, a cock in the supply pipe, a cock directly thereover in the pilot, radial pins projecting from the stems of the respective cocks, a gravity plate movably supported near its ends on the stems of said cocks, said plate being provided with a stop and with a ledge adapted to detachably engage with the respective pins, for the purpose specified.

LAZARD KAHN.
RINEHART CHRIST.

Witnesses:
THOS. C. RATCLIFF,
ROBERT S. CARR.